Patented Apr. 24, 1951

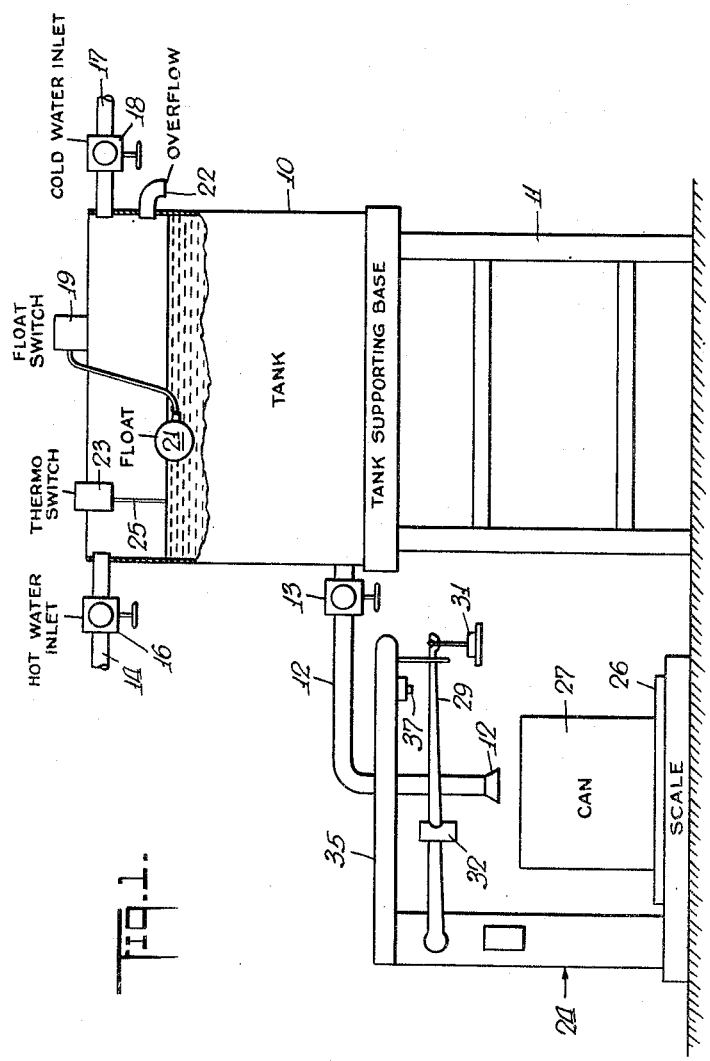

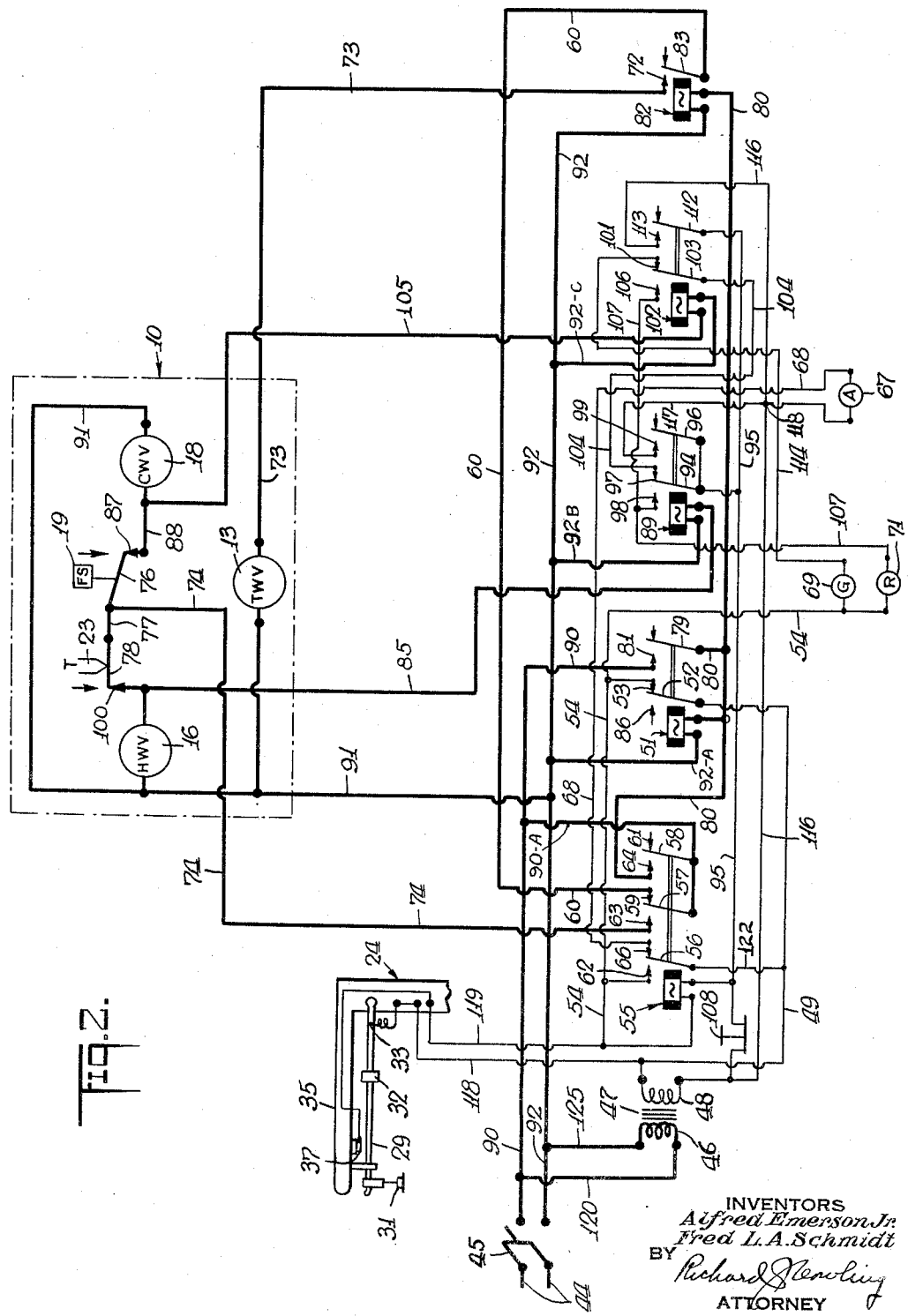

2,550,050

UNITED STATES PATENT OFFICE 2,550,050

WATER TEMPERING AND MEASURING SYSTEM

Alfred Emerson, Jr., New York, N. Y., and Fred L. A. Schmidt, Westfield, N. J., assignors to Cottage Donuts, Inc., New York, N. Y., a corporation of Maryland Application February 15, 1946, Serial No. 647,916

16 Claims. (Cl. 249—1)

1

The present invention relates generally to a water tempering and measuring system, and it has particular relation to a system which is entirely automatic in operation for speedily mixing cold and hot waters from a building water supply system and delivering accurate measured amounts of tempered water when desired, whereupon the system will refill itself automatically with sufficient quantities of hot and cold water to produce another supply of accurately tempered water.

An object of the invention is the provision of a water tempering system whereby large quantities of tempered water may be provided speedily and accurately from the regular hot and cold water supply of a conventional building water system.

Another object of the invention is to provide simple, efficient and economical means for providing an inexhaustible supply of tempered water in any measured quantity speedily and accurately.

A further object of the invention is the provision of improved mechanism responsive to the weight of the tempered water being withdrawn for operating a suitable control system for automatically refilling the supply tank with suitable quantities of hot and cold water from a building water supply system to replenish the supply of tempered water therein.

Another object of the invention is to provide means whereby when tempered water is being withdrawn from the supply tank no hot or cold water will flow into the supply tank from the building supply system to affect the temperature of the tempered water in the supply tank.

A further object of the invention is the provision of means whereby it will not be possible to withdraw a second quantity of water from the supply tank, after one quantity of water has been withdrawn, until the supply tank has been refilled and the temperature of the water therein has been adjusted to that desired.

Another object of the invention is to provide visual means or a signal for indicating when the tank is being filled with water from the building supply system, when the water in the tank has reached the desired temperature, and when tempered water is being discharged from the tank.

Other and further objects and advantages of the invention reside in the detailed construction of the several parts, which results in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a fragmentary diagrammatic view of apparatus constructed in accordance with the principles of the invention, without showing the electric wiring system connecting and operating the various parts thereof; and Figure 2 is a schematic diagram of the electric wiring system connecting and operating the various mechanical parts of the apparatus shown in Figure 1.

Referring now to the drawings, and particularly to Figure 1, there is shown a conventional water tank 10, which may or may not be insulated, mounted on a suitable supporting platform or structure 11. The tank 10 is provided with a suitable discharge outlet 12, having a conventional combination manual and electrically operable switch control valve 13. An inlet supply pipe 14 is provided for delivering hot water from a building water supply system (not shown) to the tank 10, and it is also provided with a combination manual and electrically operable switch control valve 16 of conventional construction. A second inlet supply pipe 17 is provided for delivering cold water from the building water supply system to the tank 10, and it is likewise provided with a suitable combination manual and electrically operable switch control valve 18 of conventional construction. A conventional float switch 19, having a suitable depending float ball 21 extending into the tank 10 for engaging the water therein provides means for automatically controlling the amount of water to be held in the supply tank 10. The tank 10 is also provided with a suitable outlet or overflow pipe 22 for reasons hereinafter to be described in greater detail. A conventional thermostatic control switch 23, having a depending thermostatic bulb 25 adapted to be immersed in the water contained in the tank 10 when the same is filled, regulates the amount of hot water entering the tank 10 to insure the desired temperature of the tempered water held within the supply tank 10 at all times.

It will be noted that the tank 10 is associated with a suitable electrically operable weighing scale 24, which is of conventional construction, and is provided with a weighing platform 26 adapted to support a can, pail or other container 27. The scale 26 is provided with a graduated balance arm or beam 29 adapted to support one or more counter weights, as indicated at 31, and is also provided with a suitable sliding weight 32 operable thereover in the conventional manner. The graduated balance arm or beam 29 is connected with one side of an electric circuit, as indicated at 33 (see Fig. 2) and its laterally extending supporting structure 35 is provided with a suitable electric contact 37, which is connected to the opposite side of the same electric circuit. Thus, when the metal balance arm or beam 29 swings upwardly and touches the electric contact 37 of the supporting structure 35, the electric circuit is closed, energizing the discharge valve 13 to cause it to shut-off the discharge outlet 12, thereby stopping the delivery of tempered water to the can or pail 27 resting on the scale platform 26.

Referring now to Figure 2 of the drawings, there is shown a wiring diagram for the apparatus shown in Figure 1. The various switches are in the position they would be in when it is assumed that the current is off and the tank 10 is empty or only partially filled with water. An outside source of electric energy 44 is shown suitably connected to the various circuits of the apparatus by means of a conventional double pole knife switch 45. When the switch 45 is closed, the coil 46 of the main circuit to the iron core transformer 47 will be energized. The coil to the secondary circuit of the transformer 47, which is indicated at 48, consequently also becomes energized, causing current to flow through the wire 49 to the relay 51, and through its contact arm 52, which is normally closed with the contact 53. The current passing through the contact 53 and the wire 54 causes the coil of relay 55 to function, thereby drawing the contact arms 56, 57 and 58 to the left, which not only opens the contacts 59 and 66 but also closes the contact arms 56, 57 and 58 with the contacts 62, 63 and 64, respectively.

It will be observed that when contact 66 is opened it disconnects the circuit to the amber light 67 through the wire 68. Contact 62, in closing with the arm 56 of relay 55, is parallel with contact 53 of relay 51 through the wires 49 and 54, thereby maintaining current to the coil of relay 55 and also to the green light 69.

When contact 59 of relay 55 is opened, it disconnects the circuit to contact 72 of the relay 82 through the wire 60 and contact arm 83. This contact 72 is normally open and, when closed, connects the circuit through the wire 73 to the tempered water discharge switch valve 13.

The contact 63 of relay 55, in closing with the arm 57 thereof, connects the circuit to the float switch 19 through the wire 74 and contact arm 76, and also to the thermostatic control switch 23 through the wires 74, 77 and contact arm 78 thereof. The contact 64 of relay 55, in closing with the contact arm 58 thereof, causes the coil of relay 51 to be energized through the contact arm 58 and wire 80. This causes the contact arms 52 and 79 to swing to the left, opening the contact 53 and closing the contact 81 of relay 51. It also energizes the circuit to the coil of relay 82 through the wire 80, causing its contact arm 83 to close with contact 72, which in turn prepares the circuit to the tempered water discharge valve 13 through the wire 73. The purpose of closing the circuit to the tempered water valve 13 through contact 72 after the opening of contact 59 of relay 55 is to prevent the momentary opening of the tempered water valve 13 when the switch 45 is operated to the closed position.

The contact arm 52 of relay 51, in opening with contact 53 thereof, opens the circuit paralleling contact 62 of relay 55 through the connecting wire 54. Contact 81, in closing with the contact arm 79 of relay 51, is parallel with the circuit through contact 64 of relay 55 through the wire 80, thereby locking the coil of relay 51 so that the contact arms 52 and 79 remain in electric contact with the contacts 86 and 81 thereof, respectively.

If the tank 10 is empty or only partially filled with water, the float ball 21 will drop down by gravity and cause the arm 76 of the float switch 19 to close with its contact 87. In this position, which is shown in Figure 2, the cold water inlet valve 18 will be energized through the wire 88 and be in its open position, and, at the same time, the coil of relay 102 will likewise be energized through the connecting wires 105 and 92—C, causing its contact arms 103 and 112 to be moved to the left, opening contact 101 and closing contacts 106 and 113.

When the electric circuit through contact 101 is broken by movement of the contact arm 103 of relay 102, it disconnects the circuit to contact 97 of relay 89 through the connecting arm 103 and the wire 104, and disconnects the green light 69 through the wire 114. Relay 102 through its connecting arm 103 makes electrical contact with the contact 106, energizing the red light 71 through the wire 107. Contact 113, in closing with the arm 112 of relay 102, is parallel with the push-button switch 108 through the wires 95 and 116 so that depressing this button, under such conditions, will have no effect whatsoever on the apparatus.

When the thermostatic control switch 23 is closed with its contact 100, i. e., when the temperature of the water in the tank 10 is below the temperature at which the thermostat is set, and contact 63 of relay 55 is closed with the arm 57 thereof, it will be apparent that the hot water inlet valve 16 will be energized through the wires 74 and 91, and consequently opened. The coil of relay 89 will also be energized through the wire 85, causing its contact arms 94 and 96 to be moved to the left, thereby breaking with its contact 97 and connecting its electric circuit with the contacts 98 and 99.

Contact 97 of relay 89, in opening disconnects its circuit to the green light 69 through the wire 104, contact arm 103 of relay 102, contact 101 of relay 102 and the wire 114. Contact 98, in closing with the contact arm 94, connects its circuit through the wire 107 to the red light 71. Contact 99, in closing with the arm 96 of relay 89, parallels with the push-button switch 108 through the wires 117 and 95 so that depressing its button under such conditions will have no effect whatsoever on the apparatus.

It will be apparent that the contacts 98 and 106 are connected through the wire 107, and, therefore, both connect with the red light 71 so that it will burn if either or both of the contacts 98 and 106 are closed with their respective swinging contact arms 94 and 103. The contacts 97 and 101 are connected in series through the wire 104 and contact arm 103 of relay 102. Therefore, both of them must be closed before the green light 69 will light up.

Contact 99 of relay 89 and contact 113 of relay 102 are connected at 118 through the wires 116 and 117, in parallel, with the push-button switch 108. Therefore, if either or both contacts 99 and 113 are closed, closing the push-button switch 108 by depressing its button will have no effect on the apparatus.

Assuming now a condition where the tank 10 is empty or only partially filled with tempered water, and the temperature of the water is below the setting of the thermostat of the thermostatic switch 23, it will be apparent that the relays 89 and 102 will be energized through the wires 85 and 105, respectively, and the red light 71 will be lighted. Under such conditions, the operation of either the push-button switch 108 or the switch of the scale 24 will have no effect on the apparatus. The scale switch formed by the metal balancing beam 29 and the contact 37 of the supporting structure 35 is connected in parallel through the wires 118 and 119 with the contact 62 of the relay 55.

When the tank 10 is filled with water, the float ball 21 will rise and actuate the float switch 19, causing its contact arms 76 to move away from the contact 87, thereby breaking the circuit through the connecting wire 105 and de-energizing the relay 102. When the temperature of the water in the tank 10 rises to the setting of the thermostat of the thermostatic control switch 23, its contact arm 78 will move away from the contact 100, breaking the circuit to the relay 89 through the connecting wire 85, which will be de-energized. Thereupon, the contacts 98 of relay 89 and 106 of relay 102, which are connected in parallel through the wire 107, are opened and the red light 71 will go out. Obviously, the contact arm 103 of relay 102 now connects with the contact 101 thereof, and contact arm 94 of relay 89 connects with contact 97 thereof. Contacts 101 and 97 are connected in series through the wire 104, and both are closed, thus completing the circuit through the wire 104 to the green light 69, which will be lighted. Under such conditions, the circuit to the coil of relay 55 will be de-energized when the push-button switch 108 is actuated or depressed, which in turn causes the arm 57 of relay 55 to disengage with the contact 63, thereby disconnecting the float switch 19, causing the hot and cold water inlet valves 16 and 18, respectively, to close, stopping the further flow of both hot and cold water to the tank 10. The contact arm 57 of relay 55 obviously moves into electrical contact with the contact 59 of relay 55, thus causing the discharge valve 13 to be actuated to its open position, permitting the discharge of tempered water into the can 27 on the platform of the scale 24.

It will be apparent with both the hot and cold water valves 16 and 18 open at the same time that it is possible the tank 10 will become filled with water before the proper temperature is reached according to the thermostat setting of the thermostatic switch 23. In such a case, the thermostatic switch 23 will take over and permit the hot water valve 16 to open, letting in additional hot water until the water supply in the tank 10 is properly tempered. Therefore, it is essential to provide a suitable overflow outlet pipe 22 to let the excess water in the tank 10 flow away until all the water in the tank 10 has been properly tempered and its level corresponds to the setting of the float ball 21 of the float switch 19.

Assuming now that the scale 24 has been set to operate at the desired weight by use of the proper counterweights 31 and the sliding weight 32, and the tank 10 is filled to capacity with tempered water, it will be apparent that, when the push-button switch 108 is depressed manually, it will cause the coil of relay 55 to be de-energized, moving the contact arms 56, 57 and 58 to the position shown in Figure 2 of the drawing. This movement of the contact arms 56, 57 and 58 closes the contact arm 56 with the contact 66, which, in turn, energizes the amber light 67 through the wire 68. The contact 62 is now open, disconnecting the circuit to the green light 69 and red light 71 through the wire 54. Obviously, the green light 69 and red light 71 will go out. The opening of contact 62 also opens through the wires 54 and 122 one side of the circuit to the coil of relay 55 so that further operation of the push-button switch 108 will have no effect on the apparatus.

It will be further apparent that when contact 59 closes with the contact arm 57 of relay 55, as shown in Figure 2, it will cause the circuit through the contact 72 of relay 82 and the wire 73 to be energized, thereby opening the tempered water discharge valve 13 to discharge water from the tank 10 into the can 27. When contact 63 of relay 55 is open, as shown in Figure 2, it disconnects the electric circuit to both the float switch 19 and the thermostatic switch 23 through the wire 74 so that neither the hot water valve 16 nor the cold water valve 18 can be energized or opened as long as the tempered water discharge valve 13 remains open.

After the water level in the tank 10 has receded slightly, the float ball 21 of float switch 19 will fall with the receding water level, closing the float switch 19 by moving its arm 76 into electric contact with the contact 87. This, however, will have no effect on the apparatus because contact 63 remains in its open position. When the water level in the tank 10 recedes to a level where the depending thermostatic bulb 25 of the thermostatic control switch 23 is no longer submerged, the temperature of the bulb 25 will cool to a point below the temperature setting of the thermostatic switch 23, causing its arm 78 to close into electric contact with the contact 100. The closing of the arm 78 with the contact 100 of the thermostatic switch 23 also has no effect on the apparatus since the contact 63 of relay 55 is still in its open position, as shown in Figure 2.

When the desired amount of tempered water has been drawn from the tank 10, through its open discharge valve 13 and nozzle 12 into the can 27, sitting on the platform 26 of the scale 24, its weight will cause the metal balance beam or arm 29 to move into electric contact with the contact 37 carried by the supporting arm 35 of the scale 24. This will close the scale switch and energize the coil of relay 55 which, in turn, will cause the relay arms 56, 57 and 58 to move to the left and close with their respective contacts 62, 63 and 64, which, at the same time, will open its contacts 66 and 59. This operating movement of the relay 55 through its operating arm 56 instantly opens the circuit to the amber light 67, thereby causing it to go out and at the same time causes the red light 71 to be lighted. It also closes the electric circuits to both the hot water inlet valve 16 and the cold water inlet valve 18, causing both valves to open, letting in both hot and cold waters into the tank 10. The relay 55 is locked in its closed position, which is opposite to that shown in Figure 2, through its contact arm 56 and its contact 62. It will be apparent that once the contact on the scale switch is opened, as when the can 27 of tempered water is removed from the weighing platform 26, and the balance arm 29 drops away from the contact 37, further opening or closing of said switch will have no effect on the apparatus.

The apparatus shown has been designed to operate on a regular 110 volt A. C. main circuit, and the push-button switch 108, amber light 67, red light 71, and green light 69 are adapted to be operated on an auxiliary or secondary circuit of approximately 24 volts.

In operating the apparatus, the thermostat of the thermostatic switch 23 is set to the desired temperature. The double pole knife switch 45 is closed, energizing the main circuit through the wires 90 and 92. The iron core transformer 47 is likewise energized through its wires 120 and 125, which are connected in parallel with the main circuit wires 90 and 92. The tank 10, which is empty of water, will begin to fill through the hot and cold water inlet valves 16 and 18, and the red light 71 will be lighted and remain lighted until the tank 10 is not only filled with water but the water has become tempered to the desired degree, which is the setting on the thermostat of the thermostatic switch 23. When the tank 10 is filled and the water therein has reached the desired temperature, the red light 71 will go out and the green light 69 will become lighted.

The weighing scale 24 is now set to the desired weight and the push-button switch 108 is ready to be manually actuated or depressed. Actuation of the push-button 108 will cause the tempered water discharge valve 13 to open, discharging tempered water into the can 27 through the discharge nozzle 12. At the same time, the push-button 108 is depressed, the green light goes out and the amber light 67 becomes lighted, indicating that tempered water is being discharged from the tank 10. After the desired weight of water has been run into the can 27 and the scale switch closes by the graduated balance beam 29 contacting the contact 37 thereof, the valve 13 is closed and the flow of tempered water from the tank 10 into the can 27 automatically ceases. Thereupon, the amber light 67 will go out and the red light 71 will become lighted, which indicates that the hot and cold water inlet valves 16 and 18 have been reopened to deliver more water to refill the tank 10. This cycle of operation may be repeated as often as desired as long as the main switch 45 is kept closed, and an inexhaustible supply of tempered water is always present in the tank 10. Thus, it will be obvious that we have devised a relatively simple, inexpensive and foolproof system for tempering and measuring water from the normal water supply system of a building.

Although we have described in detail only one embodiment of the invention, it will be readily apparent to those skilled in the art that the same is not so limited, but that various modifications may be made therein without departing from the spirit thereof or from the scope of the appended claims.

What we claim is:

1. In a water tempering and measuring apparatus, a supply tank, an inlet including a valve for delivering hot water from a source of supply to said supply tank, an inlet including a valve for delivering cold water from a source of supply to said supply tank, a temperature control adapted to open and close said hot water inlet valve, a liquid level control adapted to open and close said cold water inlet valve, an outlet for discharging tempered water from said supply tank, said outlet including a valve for controlling the discharge of tempered water from said supply tank, and a weight control for measuring the tempered water discharged through said outlet, said weight control being connected operatively with said outlet valve to close the same when the desired amount of tempered water has been withdrawn from said supply tank.

2. In a water tempering and measuring apparatus, a supply tank, an inlet including a valve for delivering hot water from a source of supply to said supply tank, an inlet including a valve for delivering cold water from a source of supply to said supply tank, a thermostat adapted to open and close said hot water inlet valve, a float adapted to open and close said cold water inlet valve, an outlet including a valve for controlling the discharge of tempered water from said supply tank, and a weighing device for measuring the amount of tempered water discharged through said outlet, said weighing device being connected operatively with said outlet valve to close the same when the desired quantity of tempered water has been withdrawn through said discharge outlet.

3. In a water tempering and measuring apparatus, a supply tank, an inlet including a valve for delivering hot water from a source of supply to said supply tank, an inlet including a valve for delivering cold water from a source of supply to said supply tank, a thermostat for opening and closing said hot water inlet valve, a float for opening and closing said cold water inlet valve, an outlet including a valve for controlling the discharge of tempered water from said supply tank, a weighing device for measuring the amount of tempered water discharged through said outlet, said weighing device being connected with said outlet valve to close the same when the desired quantity of tempered water has been withdrawn through said discharge outlet, and a control for opening said outlet valve to permit the discharge of tempered water from said supply tank.

4. In a water tempering and measuring apparatus, a source of electric energy, a supply tank, an inlet including a valve for delivering hot water from an outside source of supply to said supply tank, an inlet including a valve for delivering cold water from an outside source of supply to said supply tank, a thermostat for opening and closing said hot water inlet valve, a float for opening and closing said cold water inlet valve, an outlet including an electrically operable valve for controlling the discharge of tempered water from said supply tank, a weighing device for measuring the tempered water discharged through said outlet, said weighing device being connected electrically with said outlet valve for closing the same when the desired quantity of tempered water has been withdrawn from said supply tank, and an electric switch for opening said outlet valve to discharge tempered water from said supply tank.

5. In a water tempering and measuring apparatus, a source of electric energy, a supply tank, an inlet including an electrically operable valve for delivering hot water from an outside source of supply to said supply tank, an inlet including an electrically operable valve for delivering cold water from an outside source of supply to said supply tank, a thermostat connected electrically with said inlet hot water valve for opening and closing the same, said thermostat being responsive to the temperature of the water in said supply tank, a float connected electrically with said cold water valve for opening and closing the same, said float being responsive to the height of the water in said supply tank, an outlet including an electrically operable valve for controlling the discharge of tempered water from said supply tank, a device for measuring the tempered water discharged from said supply tank, said measuring device being connected electrically with said outlet valve to close the same when the desired quantity of tempered water has been withdrawn from said supply tank, an electric switch connected with said outlet valve for opening the same to discharge tempered water from said supply tank.

6. In a water tempering and measuring apparatus, a source of electric energy, a supply tank, an inlet including an electrically operable valve for delivering hot water from an outside source of supply to said supply tank, an inlet including an electrically operable valve for delivering cold water from an outside source of supply to said supply tank, a thermostat connected electrically with said inlet hot water valve for opening and closing the same, said thermostat being responsive to the temperature of the water in said supply tank, a float connected electrically with said inlet cold water valve for opening and closing the same, said float being responsive to the height of the water in said supply tank, an outlet including an electrically operable valve for controlling the discharge of tempered water from said suply tank, a device for measuring the tempered water discharged from said supply tank, said measuring device being connected electrically with said outlet valve to close the same when the desired quantity of tempered water has been withdrawn from said supply tank, an electric switch connected with said outlet valve for opening the same to discharge tempered water from said supply tank, said outlet valve being connected in an electric circuit with said thermostat and float whereby neither hot nor cold water can be taken into said supply tank while tempered water is being withdrawn therefrom.

7. In a water tempering and measuring apparatus, a source of electric energy, a supply tank, an inlet including an electrically operable valve for delivering hot water from an outside source of supply to said supply tank, an inlet including an electrically operable valve for delivering cold water from an outside source of supply to said supply tank, a thermostat connected electrically with said inlet hot water valve for opening and closing the same, said thermostat being responsive to the temperature of the water in said supply tank, a float connected electrically with said inlet cold water valve for opening and closing the same, said float being responsive to the height of the water in said suply tank, a device for measuring the tempered water discharged from said supply tank, said measuring device being connected electrically with said outlet valve to close the same when the desired quantity of tempered water has been withdrawn from said supply tank, an electric switch connected with said outlet valve for opening the same to discharge tempered water from said supply tank, said thermostat and said float being connected with said switch whereby it will be rendered inoperative so that tempered water cannot be withdrawn from said supply tank until the water contained therein has had its temperature adjusted to the desired degree.

8. In a water tempering and measuring apparatus, a source of electric energy, a supply tank having an overflow outlet, an inlet connected with an outside source of hot water supply for delivering hot water to said supply tank, an electric operable valve mounted in said inlet for controlling the delivery of hot water to said supply tank, an inlet connected with an outside source of cold water supply for delivering cold water to said supply tank, an electric operable valve mounted in said inlet for controlling the delivery of cold water to said supply tank, an electric operable thermostatic switch for controlling the amount of hot water deliverable to said supply tank, said thermostatic switch being operable through a thermometer extending into said supply tank, an electric operable float switch for controlling the amount of cold water deliverable to said supply tank, said float switch being operable through a float extending into said supply tank, an outlet for discharging tempered water from said supply tank, a device for weighing the tempered water discharged from said supply tank, and an electric operable valve mounted in said discharge outlet and adapted to be closed by said weighing device for controlling the amount of tempered water discharged from said supply tank.

9. In a water tempering end measuring apparatus, a source of electric energy, a supply tank having an overflow outlet, an inlet connected to an outside source of supply for delivering hot water to said supply tank, an electric operable valve for controlling the delivery of hot water to said supply tank, an inlet for delivering cold water to said supply tank, an electric operable valve for controlling the delivery of cold water to said supply tank, an electric operable thermostatic switch for opening and closing said hot water inlet valve, said thermostatic switch having a thermometer extending into said supply tank, an electric operable float switch for controlling the amount of cold water deliverable to said supply tank, said float switch having its float extending into said supply tank, an outlet for discharging tempered water from said supply tank, a device for weighing the tempered water discharged from said supply tank, an electric operable valve for controlling the delivery of tempered water from said supply tank, and an electric switch for opening said valve to discharge tempered water from said supply tank, said weighing device being connected electrically with said discharge valve for closing the same when the desired amount of tempered water has been withdrawn from said supply tank.

10. In a water temperaing a measuring apparatus, a source of electric energy, a supply tank having an overflow outlet, an inlet for delivering hot water from an outside source of supply to said supply tank, an electric operable valve for controlling the delivery of hot water to said supply tank, an inlet for delivering cold water from an outside source of supply to said supply tank, an electric operable valve for controlling the delivery of cold water to said supply tank, an electric thermostatic switch responsive to temperature changes in said supply tank for opening and closing said hot water inlet valve, an electric operable float switch responsive to the amount of water in said supply tank for controlling the opening and closing of said cold water inlet valve, an outlet for discharging tempered water from said supply tank, an electric operable valve for controlling the delivery of tempered water from said supply tank, a device for weighing the tempered water being discharged from said supply tank, said weighing device being connected in an electric circuit with said outlet valve for closing the same when the desired quantity of tempered water has been discharged, and an electric switch for opening said outlet valve for withdrawing another supply of tempered water from said supply tank.

11. In a water tempering and measuring apparatus, a source of electric energy, a supply tank having an overflow outlet, an inlet including an electric operable valve for delivering hot water to said supply tank, an inlet including an electric operable valve for delivering cold water to said supply tank, an electric float switch for opening and closing said cold water inlet valve, an electric thermostatic switch for opening and closing the hot water inlet valve, an outlet including an electric operable valve for discharging tempered water from said supply tank, a device for weighing the amount of tempered water discharged from said supply tank, said weighing device being connected electrically with said outlet valve for closing the same when the desired quantity of water has been withdrawn from said supply tank, and a manually operable switch for opening said outlet valve, said inlet valves being connected electrically with said outlet valve whereby the former are rendered inoperative when said outlet valve is open and tempered water is being discharged therethrough.

12. In a water tempering and measuring apparatus, a source of electric energy, a supply tank having an overflow outlet, an electric operable valve for delivering hot water to said supply tank, an electric operable valve for delivering cold water to said supply tank, an electric operable float switch for opening and closing said cold water inlet valve, an electric thermostatic switch for opening and closing said hot water inlet valve, an electric operable valve for discharging tempered water from said supply tank, a device for weighing the tempered water discharged from said supply tank, said weighing device being electrically connected with said outlet valve for closing the same when a desired amount of tempered water has been withdrawn, and an electric switch for opening said outlet valve to withdraw tempered water from said supply tank, a circuit for connecting said outlet valve electrically with said hot and cold water valves to render the same inoperable when said outlet valve is open, a circuit for connecting said inlet valves electrically with said outlet valve to render the same inoperable when either said hot or cold water inlet valve is open.

13. In a water tempering and measuring apparatus, a source of electric energy, a supply tank having an overflow outlet, an electric operable valve for delivering hot water to said supply tank, an electric operable valve for delivering cold water to said supply tank, an electric float switch for opening and closing said cold water valve, an electric thermostatic switch for opening and closing said hot water inlet valve, an electric operable outlet valve for discharging tempered water from said supply tank, a device for weighing the tempered water discharged from said supply tank, said weighing device being operatively connected with said outlet valve for closing the same when a desired quantity of tempered water has been withdrawn, a switch for opening said outlet valve for discharging tempered water from said supply tank, and a visual signal actuated by said thermostat for indicating when the water in said supply tank is tempered and ready to be withdrawn.

14. In a water tempering and measuring apparatus, a source of electric energy, a supply tank having an overflow outlet, an electric operable valve for delivering hot water to said supply tank, an electric operable valve for delivering cold water to said supply tank, an electric float switch for opening and closing said cold water valve, an electric thermostatic switch for opening and closing the hot water valve, an electric operable valve for controlling the discharge of tempered water from said supply tank, a device for weighing the amount of tempered water from said supply tank, said weighing device being connected electrically with said discharge valve for closing the same when the desired quantity of tempered water has been withdrawn, a switch for opening said discharge valve to discharge tempered water from said supply tank, and a signal operatively connected with said discharge valve for indicating when the same is open and tempered water is being withdrawn from said supply tank.

15. In a water tempering and measuring apparatus, a source of electric energy, a supply tank having an overflow outlet, an electric operable valve for delivering hot water to said supply tank, an electric operable valve for delivering cold water to said supply tank, an electric float for opening and closing said cold water valve, an electric thermostatic switch for opening and closing said hot water valve, an electric operable valve for discharging tempered water from said supply tank, a device for weighing the amount of tempered water discharged from said supply tank, said weighing device being connected electrically with said discharge valve for closing the same when a desired quantity of tempered water has been discharged, a switch for opening said discharge valve to discharge tempered water from said supply tank, and a signal operatively connected in series with said hot and cold water inlet valves for indicating when either hot or cold water is being delivered to said supply tank.

16. In a water tempering and measuring apparatus, a source of electric energy, a supply tank having an overflow outlet, an electric operable valve for delivering hot water to said supply tank, an electric operable valve for delivering cold water to said supply tank, an electric float switch for opening and closing said cold water valve, an electric thermostatic switch for opening and closing said hot water valve, an electric operable valve for discharging tempered water from said supply tank, a device for weighing the tempered water discharged from said supply tank, said weighing device being connected electrically with said discharge valve to close the same when a desired quantity of tempered water has been withdrawn, a switch for opening said discharge valve to discharge tempered water from said supply tank, a signal actuated by said thermostat for indicating when said supply tank is filled with tempered water, a signal operatively connected with said discharge valve for indicating when tempered water is being withdrawn, and a signal operatively connected in series with said hot and cold water inlet valves for indicating when either cold or hot water is being delivered to said supply tank.

ALFRED EMERSON, Jr.
FRED L. A. SCHMIDT.

REFERENCES CITED

The following references are of record in the file of this patent:

UNITED STATES PATENTS

| Number | Name | Date |
|---|---|---|
| 760,443 | Fulton | May 24, 1904 |
| 775,021 | Waterman | Nov. 15, 1904 |
| 1,110,137 | Johnson | Sept. 8, 1914 |
| 1,636,698 | Leonard et al. | July 26, 1927 |
| 1,774,475 | Bruno | Aug. 26, 1930 |
| 2,321,573 | Chace | June 8, 1943 |
| 2,332,438 | Clifford | Oct. 19, 1943 |
| 2,346,259 | Hutchings | Apr. 11, 1944 |
| 2,387,894 | Fannin | Oct. 30, 1945 |